(12) United States Patent
Kotoulas et al.

(10) Patent No.: US 10,248,701 B2
(45) Date of Patent: Apr. 2, 2019

(54) EFFICIENT DISTRIBUTED QUERY EXECUTION

(71) Applicant: International Business Machines Corporation, Armonk, NY (US)

(72) Inventors: Spyros Kotoulas, Dublin (IE); Marco L. Sbodio, Dublin (IE); Martin J. Stephenson, Ballynacargy (IE); Pierpaolo Tommasi, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 14/858,657

(22) Filed: Sep. 18, 2015

(65) Prior Publication Data

US 2017/0083632 A1 Mar. 23, 2017

(51) Int. Cl.
*G06F 17/30* (2006.01)
(52) U.S. Cl.
CPC .. *G06F 17/30566* (2013.01); *G06F 17/30442* (2013.01); *G06F 17/30448* (2013.01); *G06F 17/30545* (2013.01)
(58) Field of Classification Search
CPC ......... G06F 17/30566; G06F 17/30545; G06F 17/30442; G06F 17/30448
See application file for complete search history.

(56) References Cited

U.S. PATENT DOCUMENTS

| | | | |
|---|---|---|---|
| 6,460,043 B1 * | 10/2002 | Tabbara | G06F 17/30392 |
| 6,757,670 B1 * | 6/2004 | Inohara | G06F 17/30306 |
| 7,167,852 B1 * | 1/2007 | Ahmed | G06F 17/30587 |
| | | | 707/714 |
| 7,246,108 B2 | 7/2007 | Ahmed | |
| 7,321,888 B2 * | 1/2008 | Day | G06F 17/30474 |
| | | | 707/722 |
| 7,389,284 B1 | 6/2008 | Surlaker et al. | |
| 7,725,468 B2 | 5/2010 | Mishra | |
| 7,984,043 B1 * | 7/2011 | Waas | G06F 17/30932 |
| | | | 707/718 |
| 8,103,656 B2 | 1/2012 | Krishnamoorthy et al. | |
| 8,332,389 B2 | 12/2012 | Bestgen et al. | |

(Continued)

OTHER PUBLICATIONS

Fang et al, Efficient Top-k Query Processing Algorithms in Highly Distributed Environments, Journal of Computers, Sep. 2014, pp. 2000(7), vol. 9, No. 9, China.

*Primary Examiner* — Kris E Mackes
*Assistant Examiner* — Tiffany Thuy T Bui
(74) *Attorney, Agent, or Firm* — Cahn & Samuels, LLP

(57) ABSTRACT

An embodiment of the invention provides a method wherein a database query including a first constraint and additional constraint(s) are received in a first node. Data in the first node that satisfies the first constraint is identified, encoded, and sent to a second node. Encoded data is identified in a mapping table in the second node; and, one or more missing identifiers are identified that include encoded data that is not in the mapping table. The missing identifier is sent to the first node, decoded to retrieve the value of the missing identifier, and mapped to the retrieved value. The mapping of the missing identifier and the retrieved value are sent to the second node. A dictionary in the second node is queried with the retrieved value to identify an identification number for the retrieved value. The missing identifier is mapped to the identification number for the retrieved value.

10 Claims, 14 Drawing Sheets

(56) References Cited

U.S. PATENT DOCUMENTS

| | | | |
|---|---|---|---|
| 2005/0055369 A1* | 3/2005 | Gorelik | G06F 17/30292 |
| 2009/0265306 A1* | 10/2009 | Barsness | G06F 17/30312 |
| 2010/0174692 A1* | 7/2010 | Meyer | G06F 17/30893 |
| | | | 707/696 |
| 2011/0055199 A1* | 3/2011 | Siddiqui | G06F 17/30498 |
| | | | 707/714 |
| 2011/0093500 A1* | 4/2011 | Meyer | G06F 17/30893 |
| | | | 707/774 |
| 2012/0011150 A1 | 1/2012 | Sawminathan et al. | |
| 2013/0262443 A1 | 10/2013 | Leida et al. | |
| 2014/0195846 A1* | 7/2014 | Resch | G06F 11/1092 |
| | | | 714/6.22 |
| 2015/0032725 A1 | 1/2015 | Barykin et al. | |
| 2015/0220529 A1* | 8/2015 | Eltabakh | G06F 17/30194 |
| | | | 707/719 |
| 2015/0288384 A1* | 10/2015 | Gladwin | G06F 11/1008 |
| | | | 714/763 |
| 2016/0371355 A1* | 12/2016 | Massari | G06F 17/30557 |
| 2017/0083588 A1* | 3/2017 | Lang | G06F 17/30436 |

\* cited by examiner

Node 1 – Actual Data

Dictionary

| ID | Text |
|---|---|
| 1 | Spyros |
| 2 | Ginni |
| 3 | John |
| 4 | worksFor |
| 5 | IBM |
| 6 | SoftLayer |

SPO Index

| S | P | O |
|---|---|---|
| 1 | 4 | 5 |
| 2 | 4 | 5 |
| 3 | 4 | 6 |

POS Index

| P | O | S |
|---|---|---|
| 4 | 5 | 1 |
| 4 | 5 | 2 |
| 4 | 6 | 3 |

OPS Index

| O | P | S |
|---|---|---|
| 5 | 4 | 1 |
| 5 | 4 | 2 |
| 6 | 4 | 3 |

FIG. 5

Node 2 – Actual Data

Dictionary

| ID | Text |
|---|---|
| 10 | Spyros |
| 11 | Tom |
| 12 | Ginni |
| 13 | livesIn |
| 14 | Smithfield |
| 15 | New York |

SPO Index

| S | P | O |
|---|---|---|
| 10 | 13 | 14 |
| 11 | 13 | 14 |
| 12 | 13 | 15 |

POS Index

| P | O | S |
|---|---|---|
| 13 | 14 | 10 |
| 13 | 14 | 11 |
| 13 | 15 | 12 |

OPS Index

| O | P | S |
|---|---|---|
| 14 | 13 | 10 |
| 14 | 13 | 11 |
| 15 | 13 | 12 |

FIG. 7

EFFICIENT DISTRIBUTED QUERY EXECUTION

BACKGROUND

The present invention relates to systems, methods, and computer program products efficient distributed query execution.

Databases are becoming increasingly interlinked. For example, the Web of Data is a network of repositories, wherein the repositories can forward requests on behalf of other parties. Sometimes, the amount of data transferred is significant. Enterprises are often trying to break data silos both within and across organizations. Thus, federation approaches are becoming increasingly popular. In the technological field of electronic databases, database systems are often judged by their monetary cost per query.

SUMMARY OF THE INVENTION

An embodiment of the invention provides a method for query execution in multiple nodes of a distributed database system according to an embodiment of the invention. A database query is received in a first node of the distributed database system, the database query including a first constraint and one or more additional constraints. Data in the first node that satisfies the first constraint is identified with a first processor; and, an encoder encodes the data to generate encoded data. The encoded data is sent to a second node of the distributed database system with a first communications device.

Encoded data is identified in a mapping table in the second node with a second processor. One or more missing identifiers are identified with the second processor, the missing identifier(s) including encoded data that is not in the mapping table in the second node. The missing identifier is sent to the first node with a second communications device.

The missing identifier is decoded to retrieve the value of the missing identifier; and, the missing identifier is mapped to the retrieved value. The mapping of the missing identifier and the retrieved value are sent to the second node with the first communications device. A dictionary in the second node is queried with the retrieved value to identify an identification number for the retrieved value. The missing identifier is mapped to the identification number for the retrieved value.

BRIEF DESCRIPTION OF THE SEVERAL VIEWS OF THE DRAWINGS

The present invention is described with reference to the accompanying drawings. In the drawings, like reference numbers indicate identical or functionally similar elements.

FIG. 5 is a diagram illustrating data in Node 1 according to an embodiment of the invention.

FIG. 7 is a diagram illustrating a dictionary, a SPO index, a POS index, and an OPS index in Node 2 according to an embodiment of the invention.

DETAILED DESCRIPTION

Exemplary, non-limiting embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a system and method to improve efficiency of distributed query execution by reducing the amount of data being transferred and the computational cost of input/output (I/O) operations. Electronic databases can internalize values to improve the efficiency of indexes. More specifically, a database can effectively encode non-numeric values as integer numbers, for example, as 32 bits, 64 bits, or any other representation. Indexes can use these integers instead of the actual values to reduce space utilization and computational costs. The system can efficiently reduce the number of encoding and decoding operations in a distributed (federated) database by mapping encodings across nodes.

Figure 1:
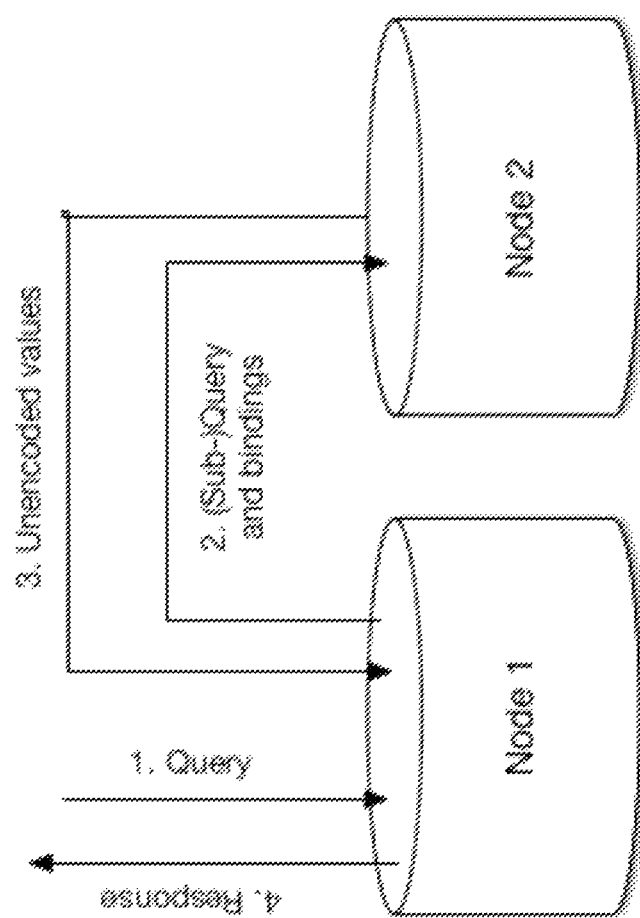
FIG. 1 is a diagram illustrating distributed querying according to an embodiment of the invention.

The system can receive a query in a node that needs to forward its results to other node(s), along with a subquery. FIG. 1 is a diagram illustrating distributed querying according to an embodiment of the invention, wherein Node 1 contains information about IBM employees (employee directory) and Node 2 contains information about people living in Smithfield, Dublin (municipal records). The query {?X worksFor IBM. ?X livesIn "Smithfield, Dublin"} can be issued to Node 1 (item 1). Node 1 can send a subquery to Node 2 (item 2). Node 2 can return [?X="Spyros Kotoulas", . . . ] to Node 1 (item 3); and, a response can be returned (item 4).

Figure 2:
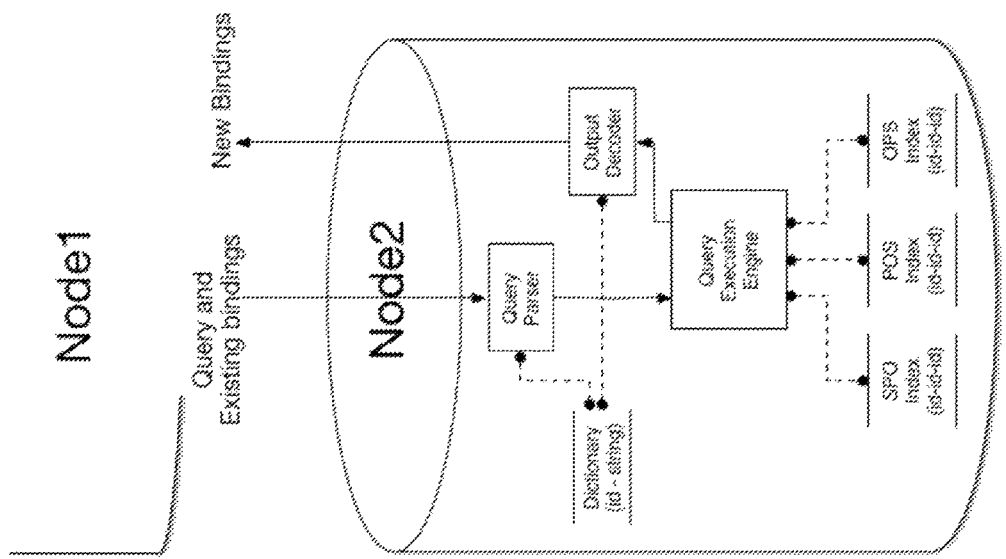
FIG. 2 is a diagram illustrating data sent between Node 1 and Node 2 according to an embodiment of the invention.

FIG. 2 is a diagram illustrating data sent between Node 1 and Node 2 according to an embodiment of the invention, wherein data is encoded using a dictionary that maps strings to integer IDs (also referred to herein as "IDs" or "identifiers"). The IDs can be indexed and most operations can be performed on these IDs. When results are to be returned, they can be decoded. In a distributed scenario, intermediate results can be encoded/decoded several times.

Figure 3:
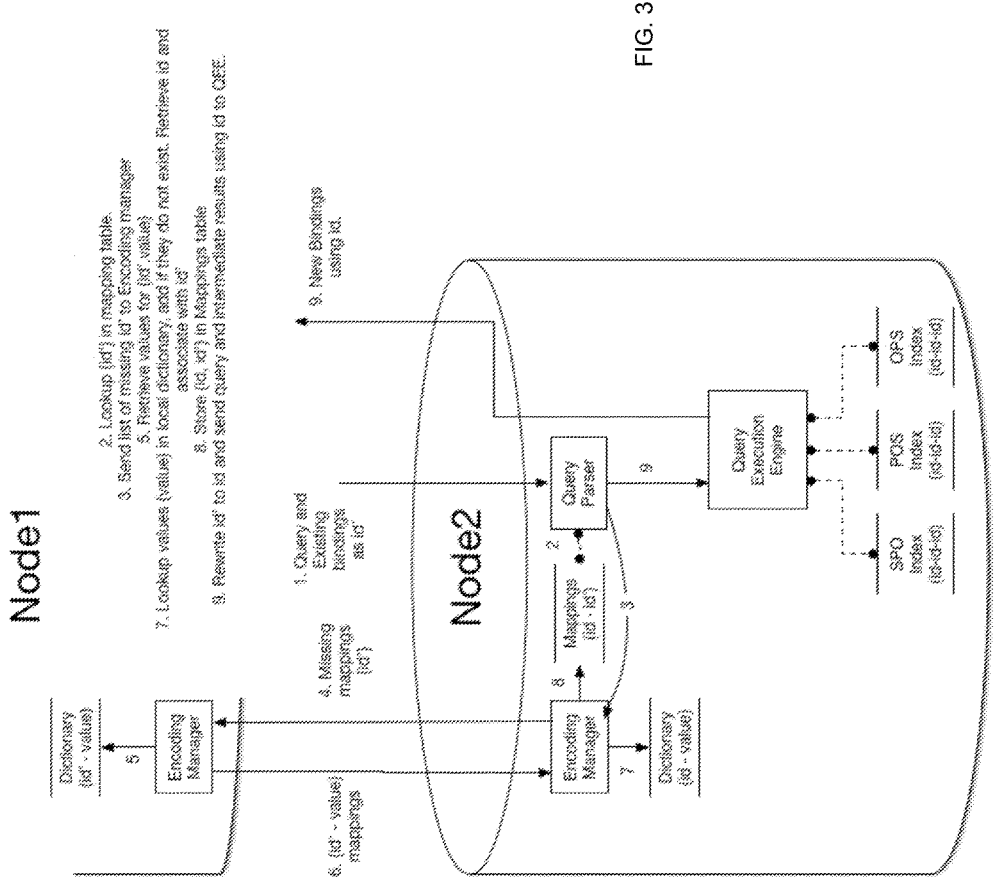
FIG. 3 is a diagram illustrating data sent between Node 1 and Node 2 according to another embodiment of the invention.

FIG. 3 is a diagram illustrating data sent between Node 1 and Node 2 according to another embodiment of the invention, wherein the system mediates across dictionaries in different nodes to reduce data transfers. Data transfers can be reduced by transferring encoded values (for Resource Description Framework (RDF), this can be around 1 order of magnitude). Computational cost can be reduced by replacing string lookups on the dictionary (that are expensive) with integer lookups in the mappings table. Unencoded values can be transferred only once.

In at least one embodiment, mappings could be pushed instead of pulled and entity-relationship-attributes (ERAs) are used in order to invalidate dictionaries. Nodes can send the era that they are in with every response. If the era of the mapping table is smaller than the one of the response, the mapping table can be invalidated and its era can be set to the new era. Moreover, invalidation messages can be used to purge old entries. When a dictionary removes an entry, this information can be forwarded to mapping tables of other nodes. Well-known identifiers can be used for part of the dictionary. For example, for mappings that are known a-priori (e.g., words in the English language), a pre-agreed range/mapping is used. For hierarchical values, each value can be encoded separately. For example, "http://www.ibm.com/products" is split into "http://", "www", ".", "ibm", ".", etc., and each element is encoded separately. IDs can also be variable in length.

Figure 4:
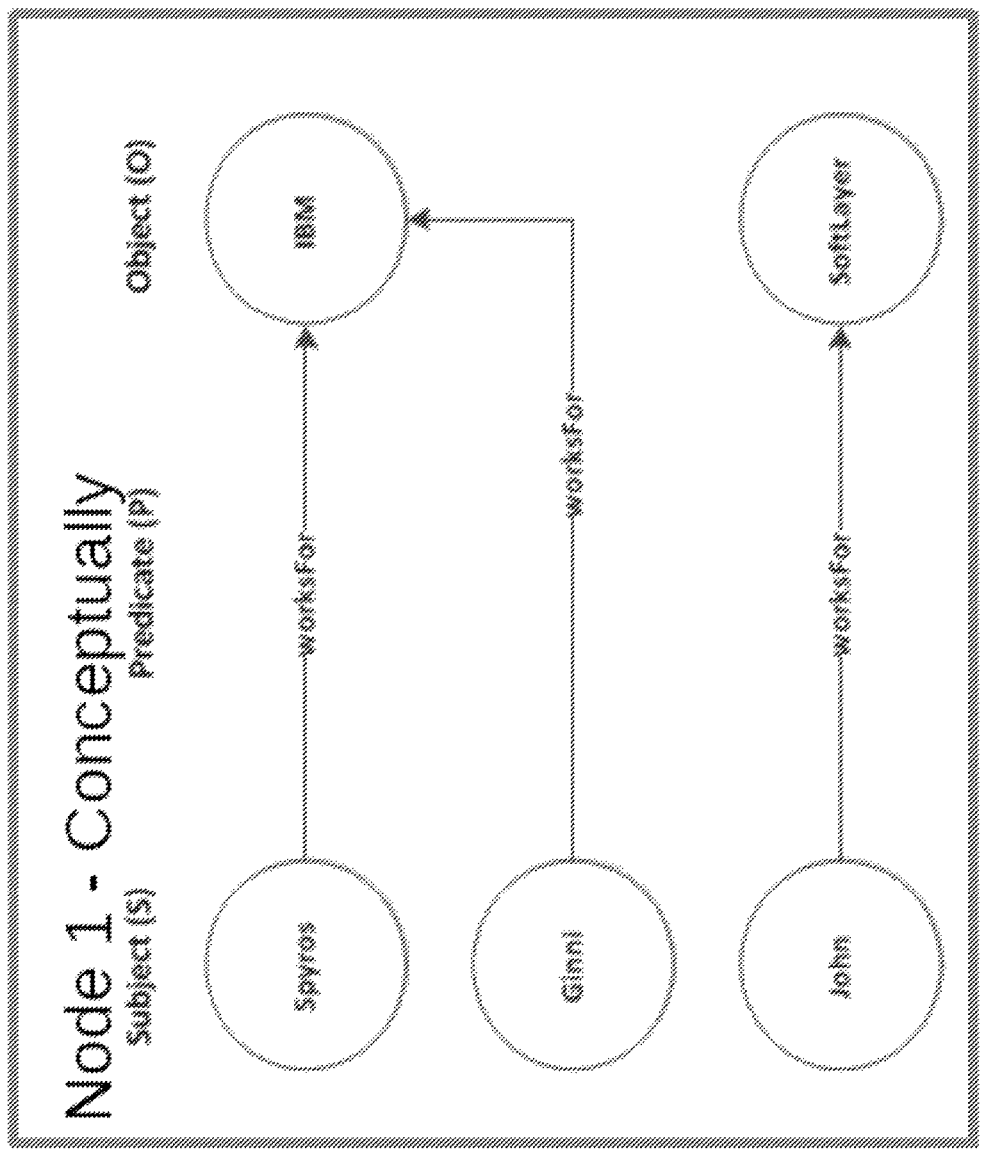
FIG. 4 is a diagram illustrating subjects, predicates and objects in Node 1 according to an embodiment of the invention.

FIG. 4 is a diagram illustrating subjects, predicates and objects in Node 1 according to an embodiment of the invention. A user wants a list of individuals that work for IBM and live in Smithfield. Thus, Node 1 can receive the query: {?X worksFor IBM. ?X livesIn Smithfield}.

FIG. 5 is a diagram illustrating a dictionary, a subject-predicate-object (SPO) index, a predicate-object-subject (POS) index, and an object-predicate-subject (OPS) index in Node 1 according to an embodiment of the invention. As illustrated in the dictionary, the IDs 1, 2, 3, 4, 5, and 6 can correspond to Spryos, Ginni, John, worksFor, IBM, and SoftLayer, respectively. Node 1 can use the dictionary to encode the query into {?X 4 5. ?X livesIn Smithfield}. Using Indexes, Node 1 can bind X to ID's 1 (Spyros) and 2 (Ginny). As illustrated in FIG. 4, both Spyros and Ginny work for IBM.

Referring back to FIG. 3, the query can be passed from Node 1 to Node 2 as [data for ?X ={1, 2}, Query={?X livesIn Smithfield }] (ID' in this case={1, 2}) (item 1). In at least one embodiment, the query sent between nodes only includes identifiers (IDs 1 and 2) of the data values, the data values (Spyros and Ginny) are not sent in the query. The query parser can look up the IDs (i.e., IDs 1 and 2) in the mapping table of Node 2 (item 2). Moreover, the query parser can send a list of missing identifiers to the encoding manager (item 3). In the present example, ID 1 (Spyros) is missing.

The encoding manager of node 2 can send the missing identifier (ID 1) to the encoding manager of Node 1 (item 4). The encoding manager of Node 1 can retrieve the value for the missing identifier (item 5). As illustrated in the dictionary in FIG. 5, ID 1 corresponds to Spyros. The mapping {1="Spyros"} can be passed back from the encoding manager of Node 1 to the encoding manager of Node 2 (item 6).

Figure 6:
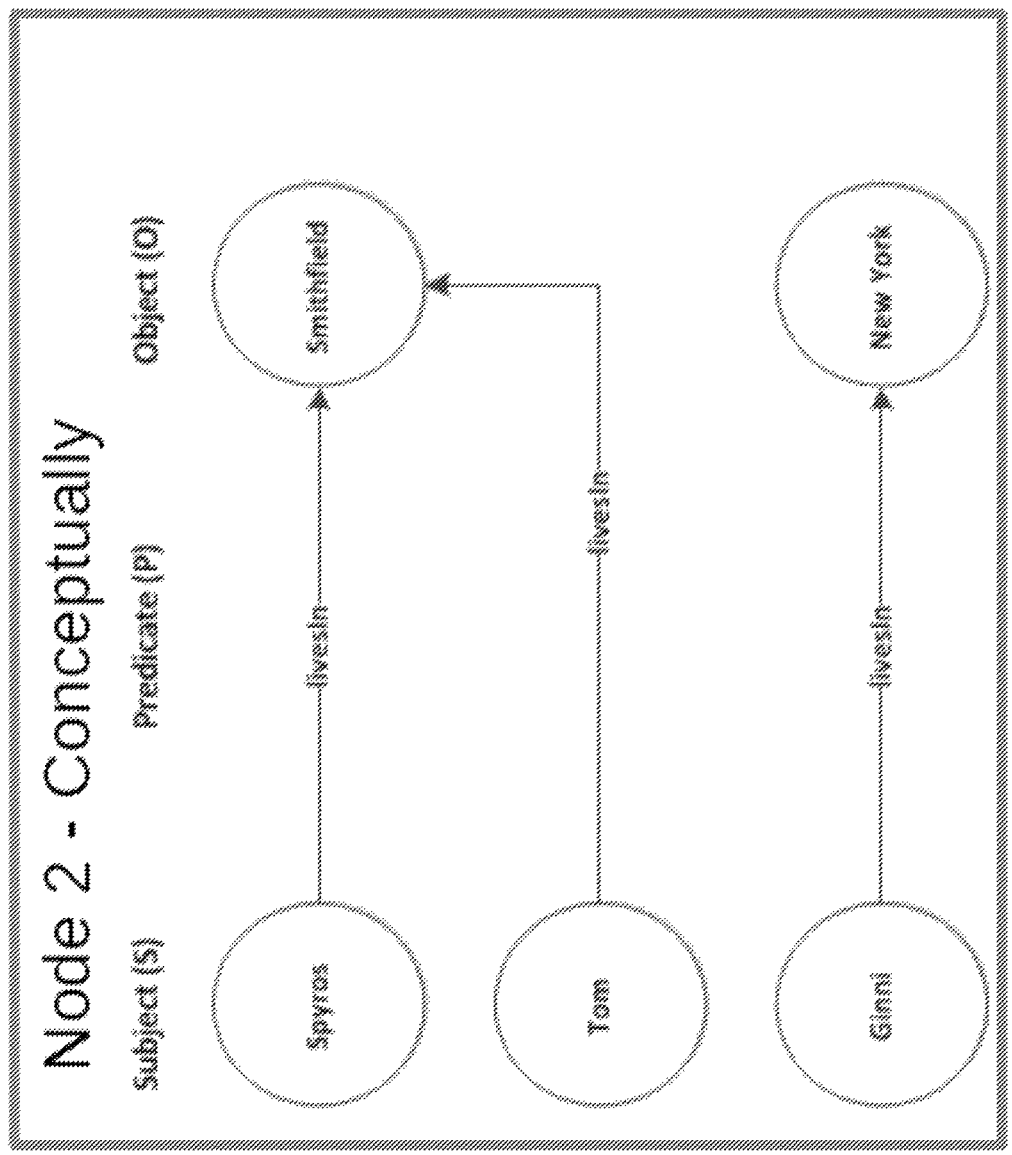
FIG. 6 is a diagram illustrating subjects, predicates and objects in Node 2 according to an embodiment of the invention.

FIG. 6 is a diagram illustrating subjects, predicates and objects in Node 2 according to an embodiment of the invention; and, FIG. 7 is a diagram illustrating a dictionary, a SPO index, a POS index, and an OPS index in Node 2 according to an embodiment of the invention. The encoding manager of Node 2 can look at the dictionary for the local ID for Spyros (item 7). As illustrated in FIG. 7, the local ID is ID 10. If Spyros was not present in the dictionary in Node 2, Spyros would be added with a new ID number. The encoding manager of Node 2 can store the mapping of ID 1=(Local) ID 10 into its mapping table (item 8). The query and data can be rewritten as [data for X={10, 12}, Query={?X 13 14} ] and sent to the query execution engine of Node 2 (item 9).

At least one embodiment of the invention reduces the amount of data being transferred among nodes executing a distributed query by sending only identifiers of the data values instead of the data values themselves. When a query or subquery is sent between nodes, the nodes do not send data values or results of the query or subquery from the sending node in the sent query or subquery. Instead, identifiers that are smaller in size than the data values are sent between the nodes. The identifiers can be elements of any non-empty countably infinite set (e.g., positive integers). The receiving node may require the actual data value only once, if and only if the corresponding identifier is not yet available in its local mapping data structure. The system can reduce the computational cost of I/O operations by encoding/decoding data value to/from corresponding identifiers only on demand, and only once per remote node in the distributed query execution scenario. The system can also reduce the computational cost of I/O operations by directly mediating across the (different) encoded representations of distributed stores.

Figure 8A:
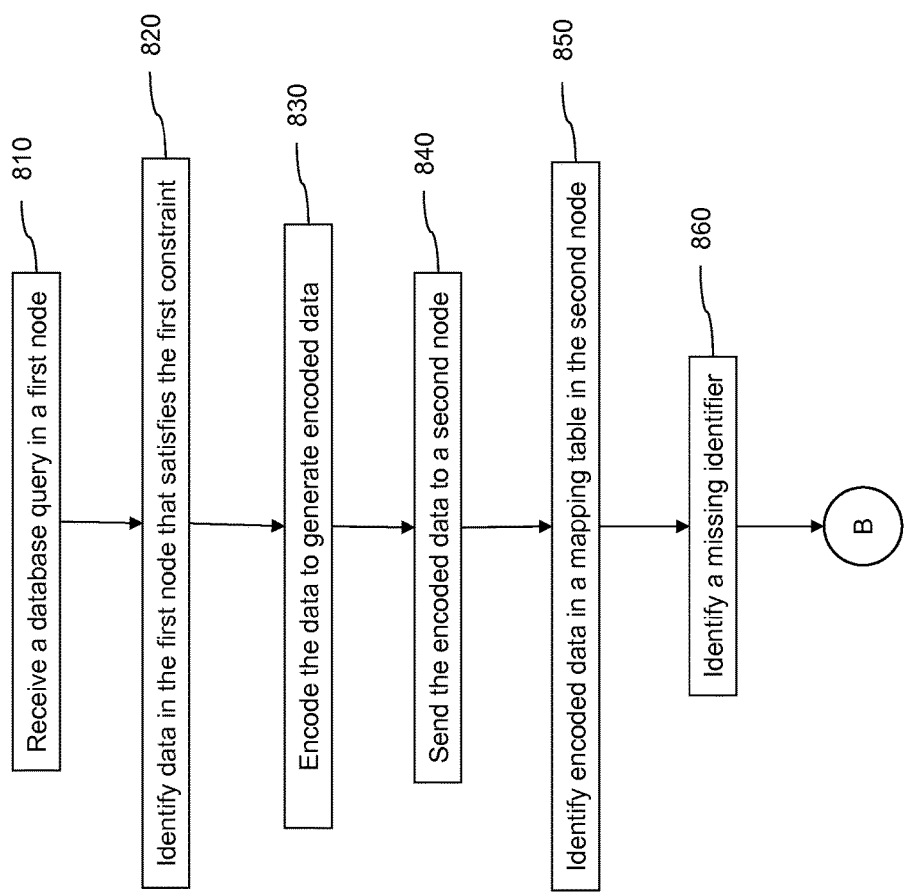
FIGS. 8A and 8B are flow diagrams illustrating a method for query execution in multiple nodes of a distributed database system according to an embodiment of the invention.
Figure 8B:
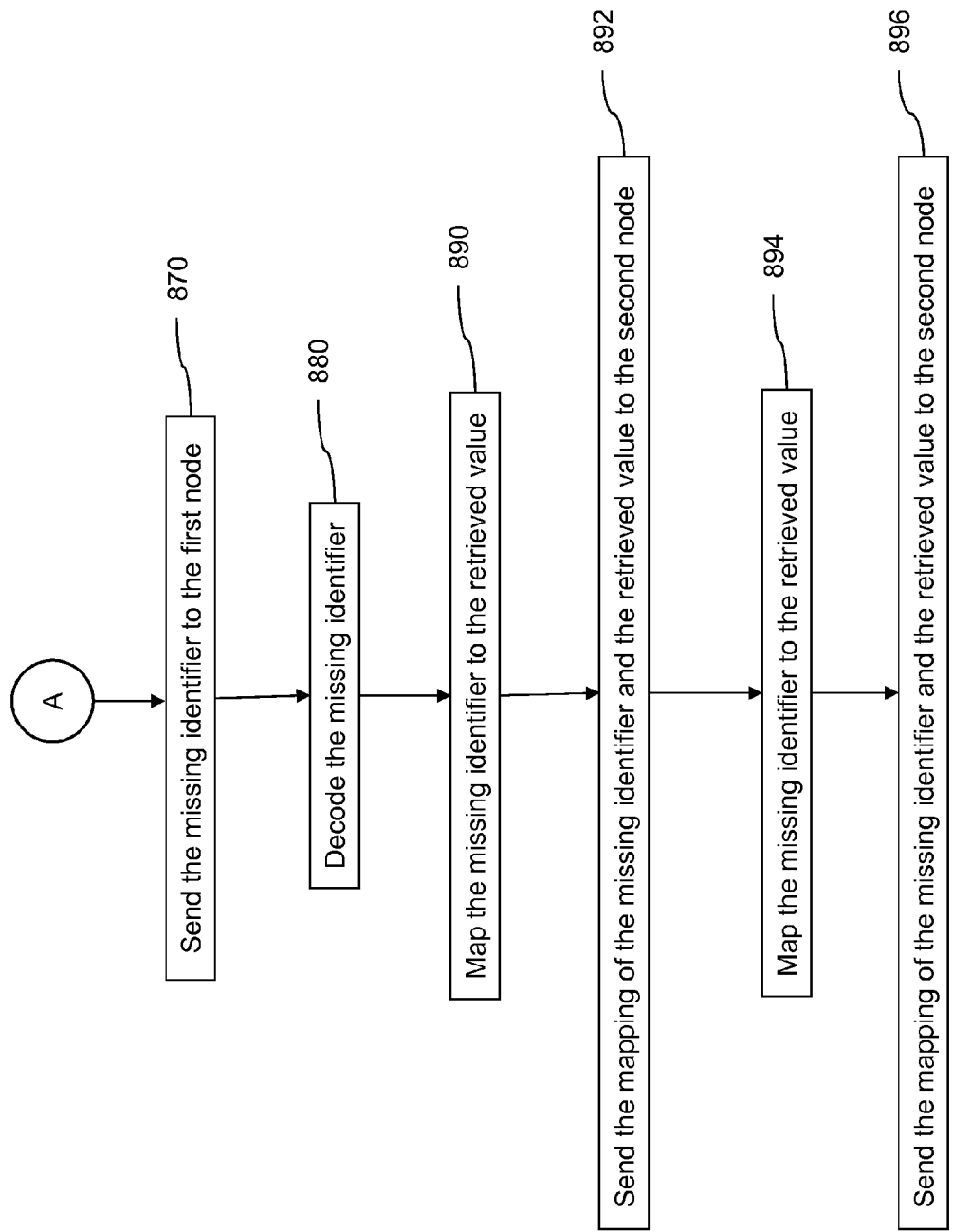

FIGS. 8A and 8B are flow diagram illustrating a method for query execution in multiple nodes of a distributed database system according to an embodiment of the invention. A database query (e.g., what are the names of the people that work for IBM that live in Smithfield) is received in a first node of the distributed database system 810, wherein the database query including a first constraint (e.g., work for IBM) and at least one additional constraint (e.g., live in Smithfield). Data in the first node that satisfies the first constraint can be identified with a first processor 820 (e.g., FIG. 4: Spyros and Gini).

The data can be encoded with an encoder to generate encoded data 830. For example, as illustrated in FIG. 5, Spyros and Ginni are encoded to 1 and 2, respectively. The encoded data can be sent to a second node of the distributed database system with a first communications device 840. Unencoded data and values of the encoded subjects are not sent from the first node. The processor, encoder, and/or the first communications device can be positioned in the first node. As used herein, the terms processor, encoder, and communications device can include computer hardware devices, such as, for example, microprocessors, central processing units (CPUs), etc.

A second processor can identify encoded data that is in a mapping table in the second node 850 (e.g., 2). The second processor can also identify at least one missing identifier 860, wherein the missing identifier includes encoded data that is not in the mapping table in the second node (e.g., 1). In the above example, the encoded data that is in the mapping table in the second node is 2, and the missing identifier is 1. The missing identifier(s) can be sent to the first node with a second communications device 870. The second processor and/or the second communications device can be positioned in the second node.

The missing identifier (e.g., 1) can be decoded (e.g., with the first processor) to retrieve the value of the missing identifier (e.g., Spyros) 880. In at least one embodiment, the missing identifier is mapped to the retrieved value (e.g., with the first processor) 890; and, the mapping of the missing identifier and the retrieved value are sent to the second node (e.g., with the first communications device) 892. A dictionary in the second node can be queried with the retrieved value (e.g., Spyro) (e.g., with the second processor) to identify the identification number for the retrieved value (e.g., ID 10 in FIG. 7) 894. The missing identifier (e.g., 1) can be mapped to the identification number (e.g., ID 10) for the retrieved value (e.g., with the second processor) 896.

In at least one embodiment of the invention (e.g., FIG. 7), each node includes a data field, a predicate field, and an object field, wherein a predicate (e.g., lives in) in the second node is encoded to generate an encoded predicate (e.g., 13), and wherein an object (e.g., Smithfield) in the second node is encoded to generate an encoded object (e.g., 14). The database query can be rewritten to include: the identification number for the retrieved value (e.g., ID 10); an identification number (e.g., 12 (Ginni in node 2)) for the encoded data (e.g., 2 (Ginni in node 1)) that is in the mapping table in the second node; the encoded predicate (e.g., 13); and the encoded object (e.g., 14).

Figure 9:
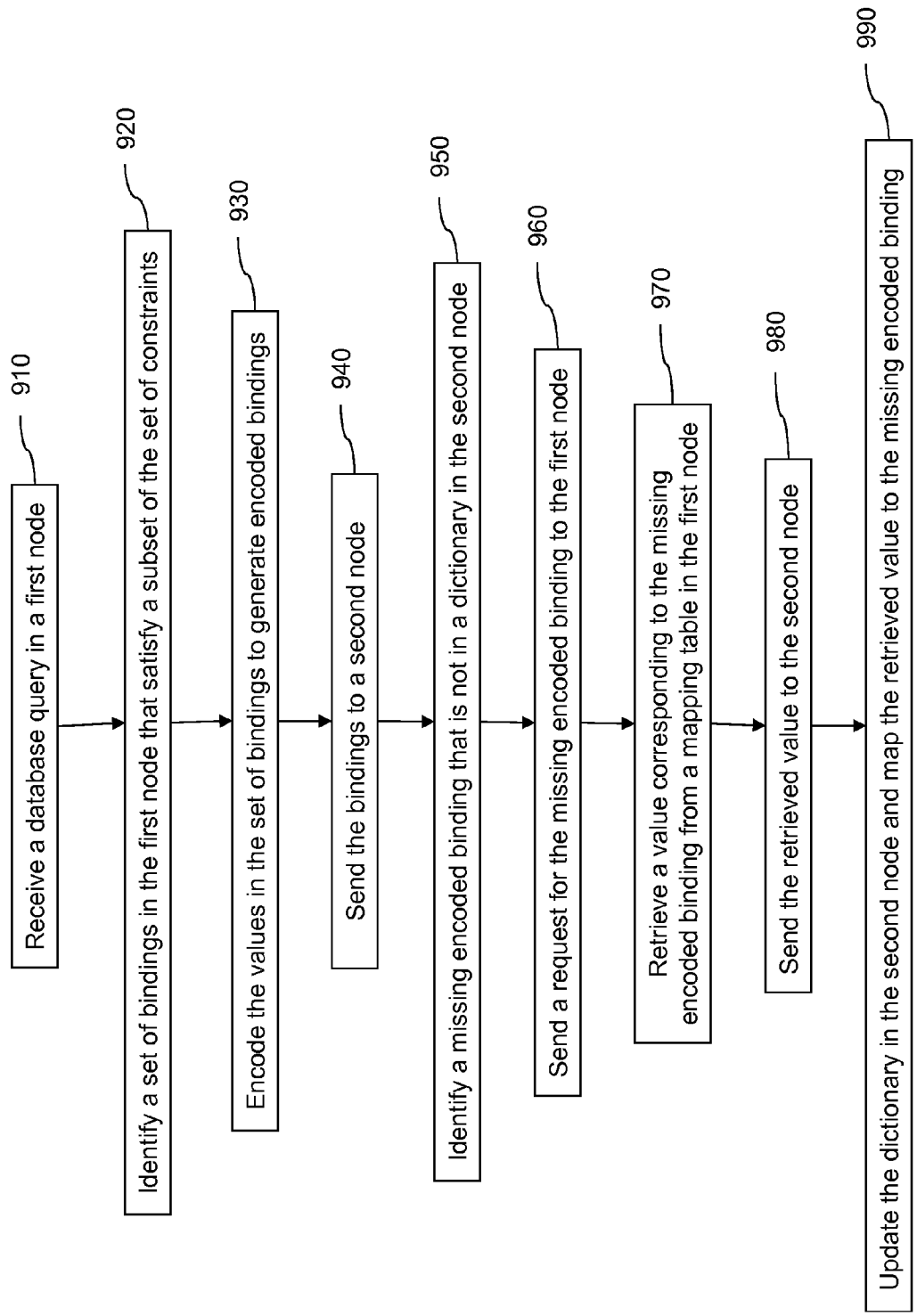
FIG. 9 is a flow diagram illustrating a method for improving the efficiency of distributed query execution in multiple nodes of a federated database system according to an embodiment of the invention.

FIG. 9 is a flow diagram illustrating a method for improving the efficiency of distributed query execution in multiple nodes of a federated database system according to an embodiment of the invention. A database query can be received in a first node of the federated database system 910, wherein the database query can include a set of constraints C={C1, C2, . . . Cn}. For example, C1=works for IBM; and, C2=lives in Smithfield. The set of constraints can include variables, wherein a variable is an unknown element in a constraint in the subset of the set of constraints, and wherein the value satisfies the constraint.

A set of bindings can be identified with a first processor, wherein the set of bindings are in the first node and satisfy a subset of the set of constraints 920. For example, the set of bindings can include Spyros Kotoulas and Gini Rommety. Each binding can include a variable and a value (<variable, value>). The values in the set of bindings can be encoded with an encoder to generate encoded bindings 930. The bindings can be sent to a second node of the federated database system with a first communications device, wherein only the encoded bindings are sent 940. Unencoded bindings are not sent from the first node.

At least one missing encoded binding that is not in a dictionary in the second node can be identified with a second processor 950. The second processor can also identify one or more encoded binding(s) that are in the dictionary in the second node. A request for the missing encoded binding can be sent to the first node with a second communications device 960.

In at least one embodiment, a value corresponding to the missing encoded binding is retrieved (e.g., with the first processor) from a mapping table in the first node 970; and, the retrieved value is sent to the second node (e.g., with the first communications device) 980. The dictionary in the second node can be updated with the retrieved value and the retrieved value can be mapped to the missing encoded binding (e.g., with the second processor) 990.

The second processor can also identify a second set of bindings in the second node that satisfies a second subset of the set of constraints. The previous process (e.g., items 910-990) can be repeated for every other node in the federated database system until all of the set of constraints are satisfied (i.e., until the answer to the distributed query is computed, or until it becomes impossible for any node in the federated database system to satisfy the remaining constraints in C (the answer to the query cannot be computed)).

The first processor can retrieve encoded values from the mapping table in the first node. Various kinds of encoding system can be used, wherein encoded values have a binary representation requiring fewer bits/bytes than the corresponding unencoded values. The remaining constraints to satisfy a second subset of the set of constraints can be sent to the second node, wherein the second subset of the set of constraints can be the difference between the original set of constraints and the first subset of the set of constraints.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
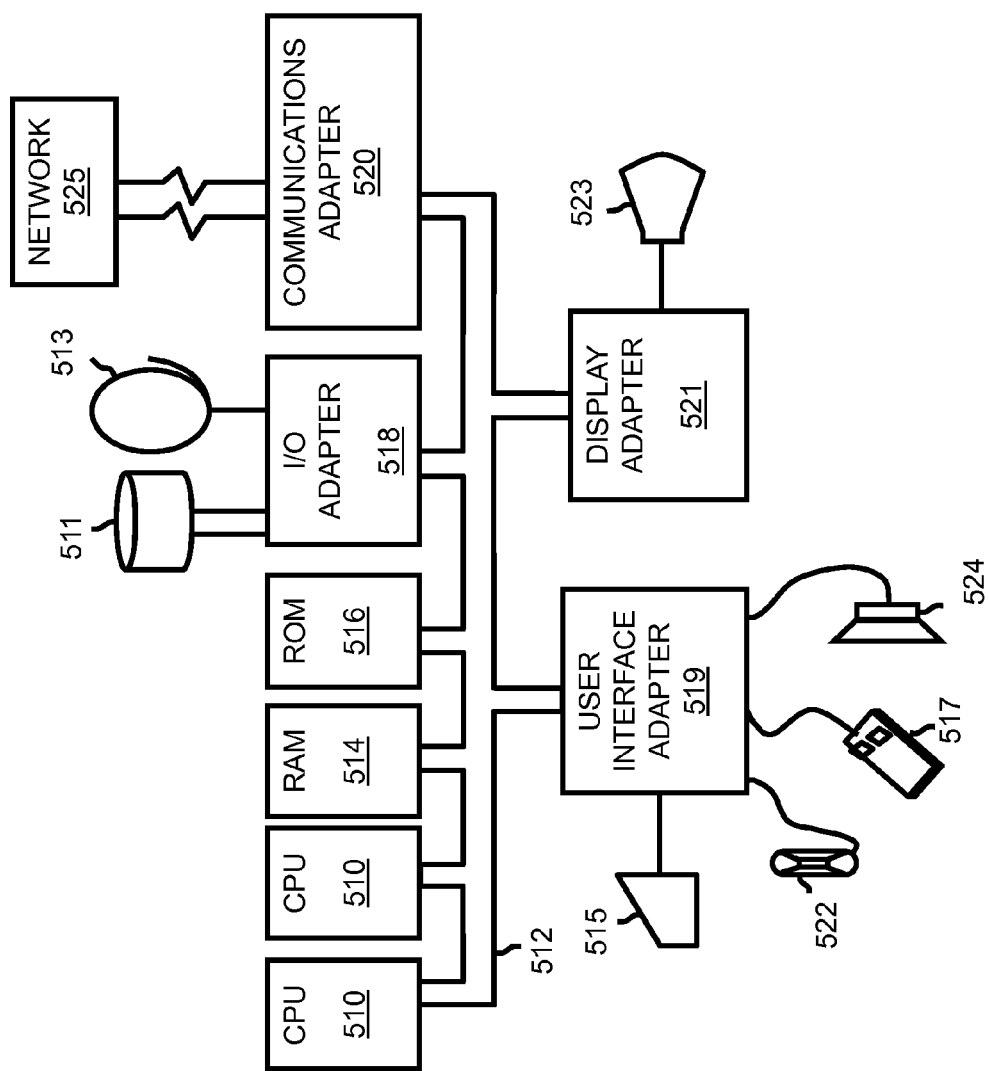
FIG. 10 is a diagram illustrating a computer program product according to an embodiment of the invention.

Referring now to FIG. 10, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 510. The CPUs 510 are interconnected with system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of at least one embodiment of the invention. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.'

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
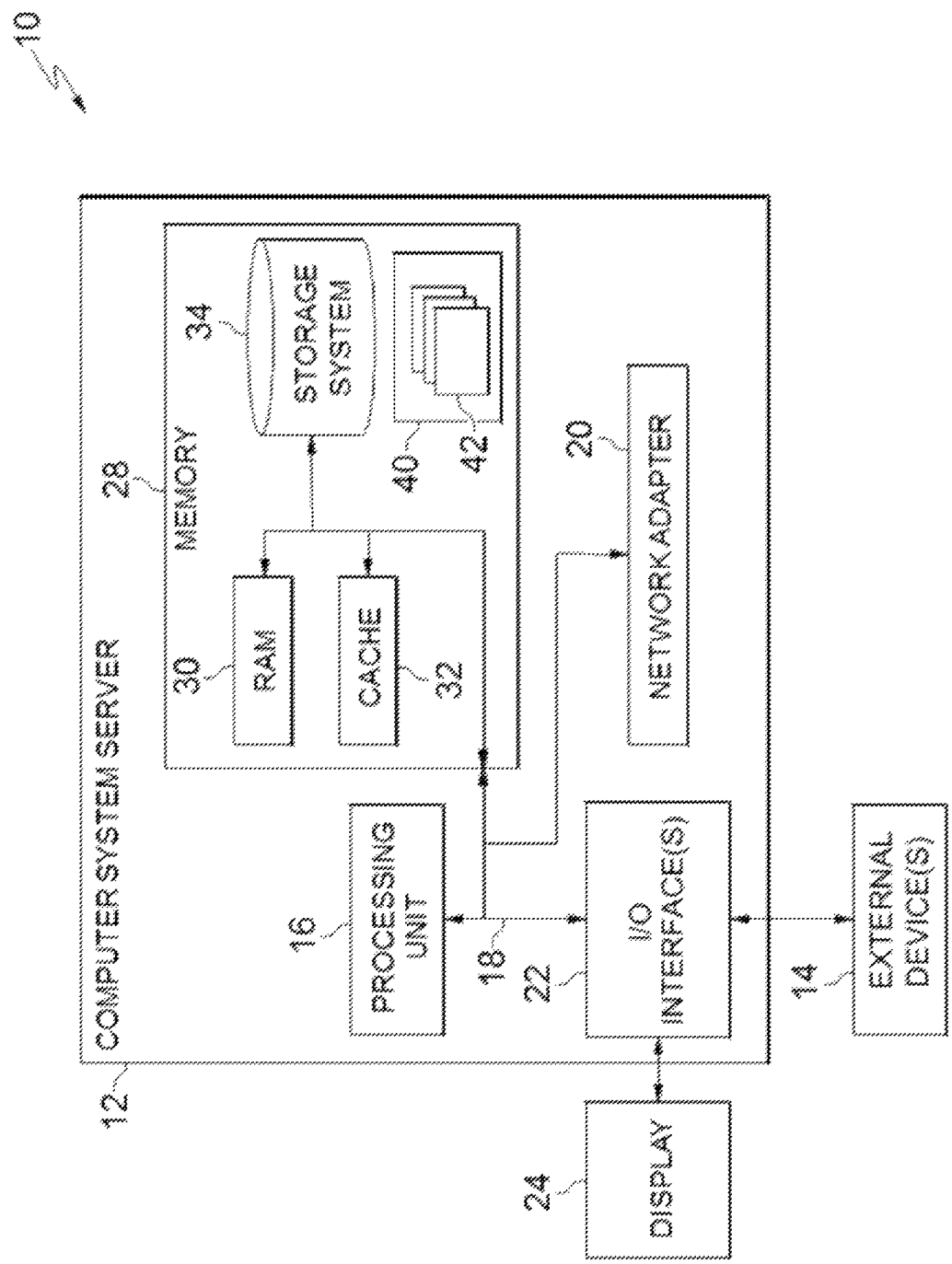
FIG. 11 is a diagram illustrating a computer program product according to an embodiment of the invention.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer systemexecutable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
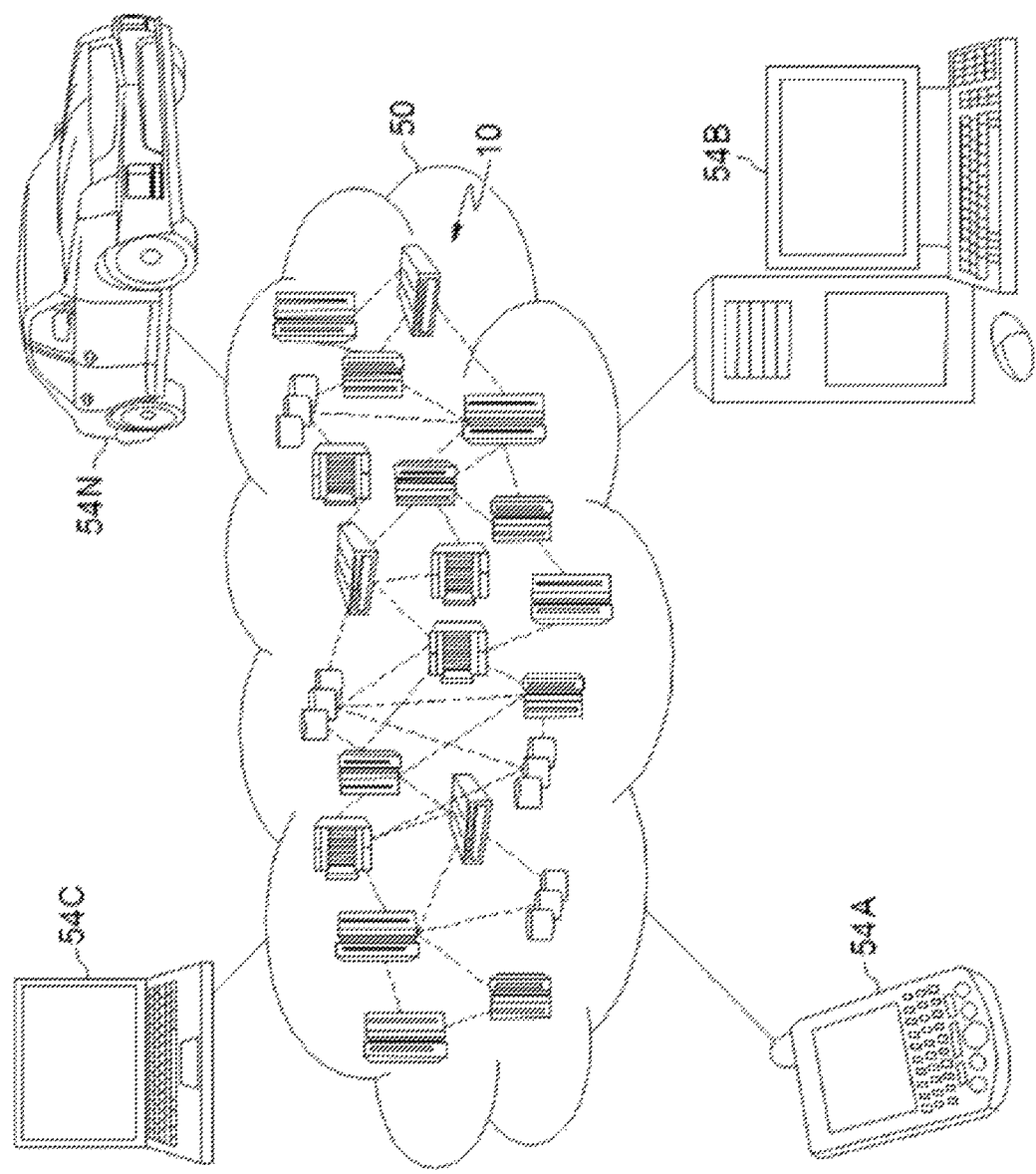
FIG. 12 depicts a cloud computing node according to an embodiment of the present invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
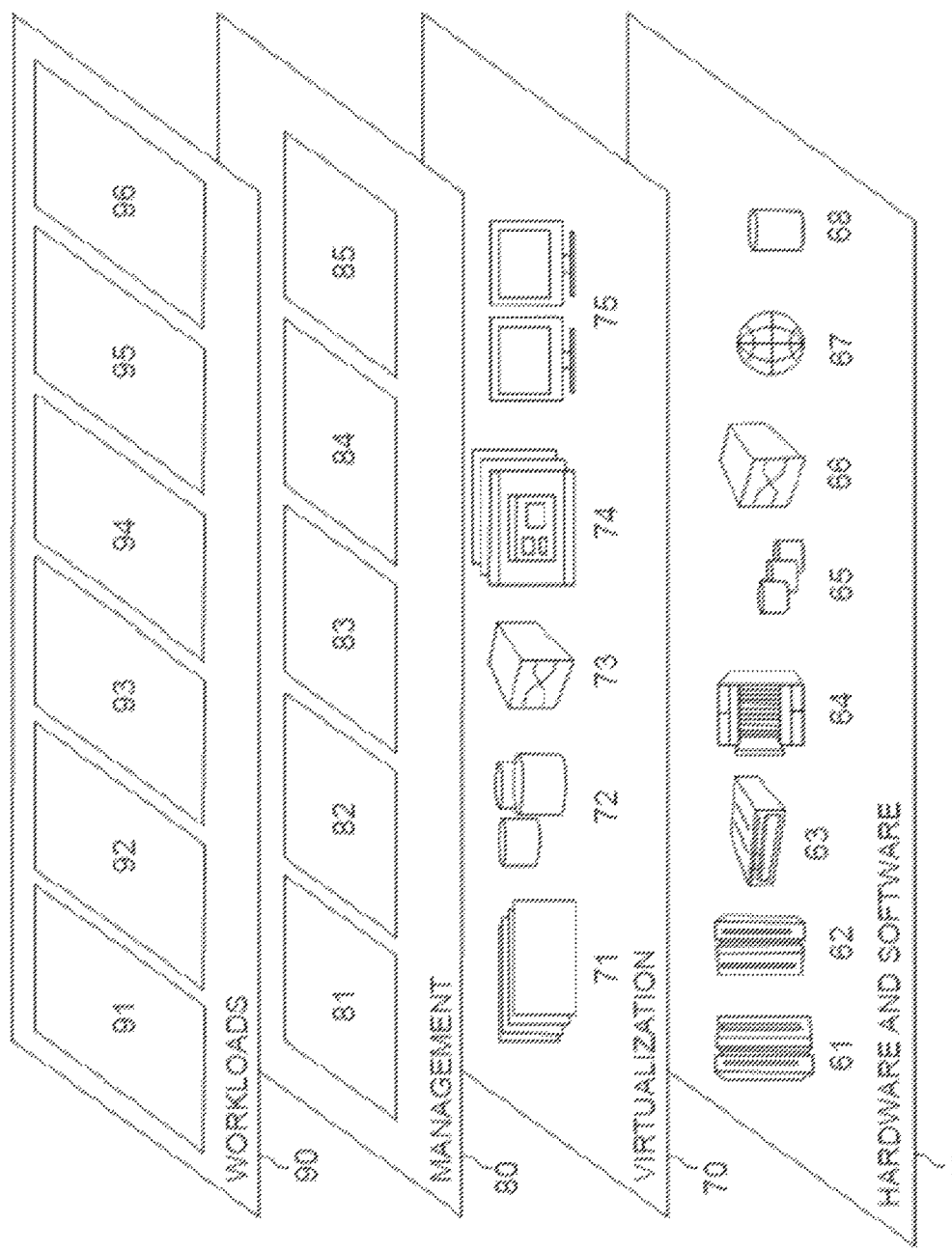
FIG. 13 depicts a cloud computing environment according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cross-device and cross-channel advertising and remarketing 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for query execution in multiple nodes of a distributed database system, said method comprising:
   receiving a database query in a first node of the distributed database system, the database query including a first constraint and at least one additional constraint;
   identifying data in the first node that satisfies the first constraint with a first processor;
   encoding the data with an encoder to generate encoded data;
   sending the encoded data to a second node of the distributed database system with a first communications device, wherein each node of the nodes includes a data field, a predicate field, and an object field;
   encoding a predicate in the second node to generate an encoded predicate; and encoding an object in the second node to generate an encoded object;

identifying at least one encoded data of the encoded data that is in a mapping table in the second node with a second processor;

identifying at least one missing identifier with the second processor, the at least one missing identifier including at least one encoded data of the encoded data that is not in the mapping table in the second node;

sending the missing identifier to the first node with a second communications device;

decoding the missing identifier to retrieve the value of the missing identifier;

mapping the missing identifier to the retrieved value;

sending the mapping of the missing identifier and the retrieved value to the second node with the first communications device;

querying a dictionary in the second node with the retrieved value to identify an identification number for the retrieved value;

rewriting the database query to include:
  the identification number for the retrieved value; and
  at least one identification number for the at least one encoded data of the
  encoded data that is in the mapping table in the second node; and mapping the missing identifier to the identification number for the retrieved value.

2. The method according to claim 1, wherein said rewriting of the database query includes rewriting the database query to include:
  an encoded predicate; and
  an encoded object.

3. The method according to claim 1, wherein unencoded data is not sent to the second node of the distributed database system.

4. The method according to claim 1, wherein values of the encoded subjects are not sent to the second node of the distributed database system.

5. A method for improving the efficiency of distributed query execution in multiple nodes of a federated database system, said method comprising:
  receiving a database query in a first node of the federated database system, the database query including a set of constraints;
  identifying a set of bindings with a first processor in the first node that satisfies a subset of the set of constraints, wherein each binding in the set of bindings includes a variable and a value;
  encoding the values in the set of bindings with an encoder to generate encoded bindings;
  sending bindings to a second node of the federated database system with a first communications device, said sending of the bindings to the second node including only sending the encoded bindings;
  identifying a second set of bindings in the second node that satisfies a second subset of the set of constraints;
  identifying at least one missing encoded binding of the encoded bindings that is not in the dictionary in the second node with a second processor;
  sending a request for the missing encoded binding with a second communications device, the request being sent to the first node;
  repeating previous process for every other node in the federated database system until all of the set of constraints are satisfied;
  retrieving a value corresponding to the missing encoded binding from a mapping table in the first node;
  retrieving encoded values from the mapping table in the first node,
  sending the remaining constraints to satisfy the second subset of the set of constraints to the second node, wherein the second subset of the set of constraints is the difference between the set of constraints and the subset of the set of constraints;
  sending the retrieved value to the second node with the first communications device; and
  updating the dictionary in the second node with the retrieved value and mapping the retrieved value to the missing encoded binding with the second processor.

6. The method according to claim 5, wherein the set of constraints include variables.

7. The method according to claim 5, wherein the variable is an unknown element in a constraint in the subset of the set of constraints, and wherein the value satisfies the constraint.

8. The method according to claim 5, further comprising identifying at least one encoded binding of the encoded bindings that is in a dictionary in the second node.

9. The method according to claim 5, wherein unencoded bindings are not sent to the second node of the federated database system.

10. A computer program product for improving the efficiency of distributed query execution in multiple nodes of a federated database system, said computer program product comprising:
  a non-transitory computer readable storage medium having stored thereon:
  first program instructions executable by a device to cause the device to receive a database query in a first node of the federated database system, the database query including a set of constraints;
  second program instructions executable by the device to cause the device to identify a set of bindings in the first node that satisfies a subset of the set of constraints, wherein each binding in the set of bindings includes a variable and a value;
  third program instructions executable by the device to cause the device to encode the values in the set of bindings to generate encoded bindings;
  fourth program instructions executable by the device to cause the device to send bindings to a second node of the federated database system, wherein said fourth program instructions only sends the encoded bindings;
  fifth program instructions executable by the device to cause the device to identify at least one missing encoded binding of the encoded bindings that is not in the dictionary in the second node;
  sixth program instructions executable by the device to cause the device to send a request for the missing encoded binding to the first node;
  seventh program instructions executable by the device to cause the device to retrieve a value corresponding to the missing encoded binding from a mapping table in the first node;
  eighth program instructions executable by the device to cause the device to send the retrieved value to the second node;
  ninth program instructions executable by the device to cause the device to update the dictionary in the second node with the retrieved value and mapping the retrieved value to the missing encoded binding;

tenth program instructions executable by the device to cause the device to identify a second set of bindings in the second node that satisfies a second subset of the set of constraints;

eleventh program instructions executable by the device to cause the device to repeat previous process for every other node in the federated database system until all of the set of constraints are satisfied;

twelfth program instructions executable by the device to cause the device to retrieve encoded values from the mapping table in the first node; and thirteenth program instructions executable by the device to cause the device to send the remaining constraints to satisfy the second subset of the set of constraints to the second node, wherein the second subset of the set of constraints is the difference between the set of constraints and the subset of the set of constraints.

* * * * *